(12) United States Patent
Xu et al.

(10) Patent No.: US 10,387,308 B2
(45) Date of Patent: Aug. 20, 2019

(54) METHOD AND APPARATUS FOR ONLINE REDUCING CACHING DEVICES

(71) Applicant: EMC IP Holding Company LLC, Hopkinton, MA (US)

(72) Inventors: Xinlei Xu, Beijing (CN); Liam Xiongcheng Li, Beijing (CN); Jian Gao, Beijing (CN); Lifeng Yang, Beijing (CN); Ruiyong Jia, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 190 days.

(21) Appl. No.: 15/268,801

(22) Filed: Sep. 19, 2016

(65) Prior Publication Data

US 2017/0103020 A1    Apr. 13, 2017

(30) Foreign Application Priority Data

Sep. 22, 2015   (CN) .......................... 2015 1 0609728

(51) Int. Cl.
| | | |
|---|---|---|
| *G06F 9/45* | (2006.01) | |
| *G06F 12/08* | (2016.01) | |
| *G06F 12/0808* | (2016.01) | |
| *G06F 12/0815* | (2016.01) | |
| *G06F 12/128* | (2016.01) | |
| *G06F 12/0895* | (2016.01) | |
| *G06F 12/126* | (2016.01) | |

(52) U.S. Cl.
CPC ...... *G06F 12/0808* (2013.01); *G06F 12/0895* (2013.01); *G06F 12/128* (2013.01); *G06F 12/126* (2013.01); *G06F 2212/1041* (2013.01); *G06F 2212/1044* (2013.01); *G06F 2212/621* (2013.01)

(58) Field of Classification Search
CPC .. G06F 12/0813; G06F 12/0815; G06F 12/10; G06F 12/1072; G06F 9/4493; G06F 12/0284; G06F 12/0802; G06F 12/0806; G06F 2212/1044; G06F 2212/2022; G06F 2212/2542
USPC ........................................................ 711/135
See application file for complete search history.

(56) References Cited

U.S. PATENT DOCUMENTS

| | | | | |
|---|---|---|---|---|
| 6,633,967 B1 * | 10/2003 | Duncan | ............... | G06F 12/1027 710/3 |
| 6,701,393 B1 * | 3/2004 | Kemeny | ............... | G06F 12/122 710/40 |
| 7,676,554 B1 * | 3/2010 | Malmskog | ............ | G06F 11/073 709/219 |
| 8,607,208 B1 * | 12/2013 | Arnold | .................... | G06F 8/656 717/153 |

(Continued)

*Primary Examiner* — Mohamed M Gebril
(74) *Attorney, Agent, or Firm* — BainwoodHuang

(57) ABSTRACT

The present disclosure provides a method and apparatus for online reducing cache devices from a cache. The cache includes a first cache device and a second cache device, the method comprising: keeping the cache and the second cache device in an enabled state; labeling the first cache device as a to-be-reduced device so as to block a new data page from being promoted to the first cache device; removing a cached data page from the first cache device; removing the cached input output (IO) historical information from the first cache device; and removing the first cache device from the cache. There is also provided a corresponding apparatus.

19 Claims, 9 Drawing Sheets

(56) References Cited

U.S. PATENT DOCUMENTS

| | | | |
|---|---|---|---|
| 2006/0004860 A1* | 1/2006 | Liedes | G06F 11/1471 |
| 2011/0082962 A1* | 4/2011 | Horovitz | G06F 11/301 |
| | | | 711/6 |
| 2011/0106804 A1* | 5/2011 | Keeler | G06F 3/061 |
| | | | 707/737 |
| 2011/0145489 A1* | 6/2011 | Yu | G06F 3/0613 |
| | | | 711/103 |
| 2013/0132681 A1* | 5/2013 | Wang | G06F 12/126 |
| | | | 711/137 |
| 2013/0159662 A1* | 6/2013 | Iyigun | G06F 12/08 |
| | | | 711/206 |
| 2013/0205089 A1* | 8/2013 | Soerensen | G06F 12/0811 |
| | | | 711/122 |
| 2014/0325145 A1* | 10/2014 | Sampathkumar | G06F 12/0868 |
| | | | 711/114 |
| 2014/0379959 A1* | 12/2014 | Canepa | G06F 12/0246 |
| | | | 711/103 |
| 2016/0210044 A1* | 7/2016 | Mitkar | G06F 3/061 |

* cited by examiner

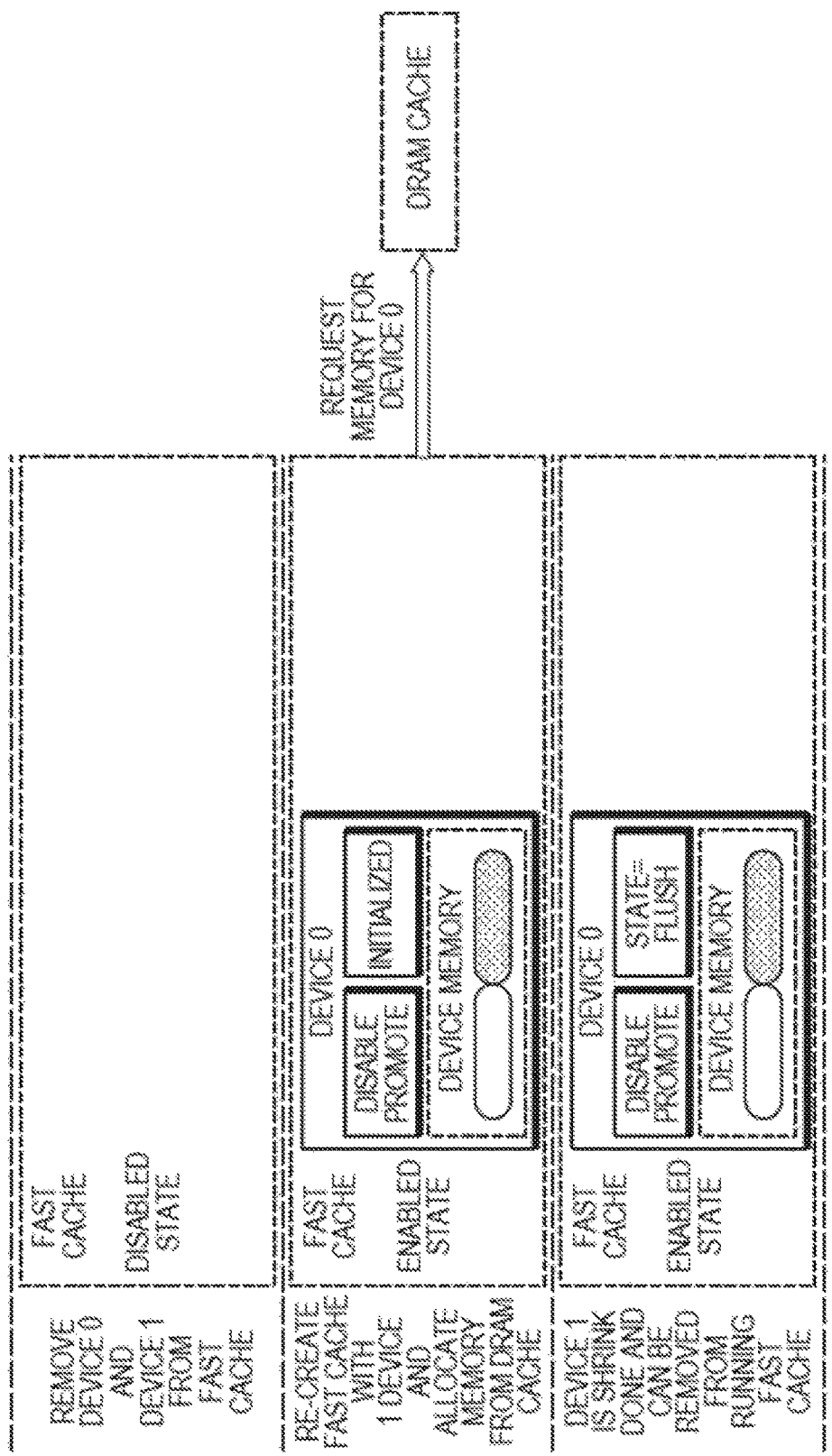

# METHOD AND APPARATUS FOR ONLINE REDUCING CACHING DEVICES

RELATED APPLICATION

This application claim priority from Chinese Patent Application Number CN201510609728.9, filed on Sep. 22, 2015 at the State Intellectual Property Office, China, titled "METHOD AND APPARATUS FOR REDUCING CACHE DEVICE ONLINE," the contents of which is herein incorporated by reference in its entirety.

FIELD OF THE INVENTION

Embodiments of the present disclosure relate to a data storage system, and more specifically to online reducing caching devices from a cache.

BACKGROUND OF THE INVENTION

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY OF THE INVENTION

Hereinafter, a brief summary of various embodiments is given below so as to provide basic understanding of some aspects of the various embodiments. The summary is not intended to identify gist of key elements or describe scopes of various embodiments. The only objective lies in rendering some concepts in a simplified manner as a prelude to the subsequent more specific depiction.

A first aspect of the present disclosure provides a method of online reducing cache devices from a cache, the cache including a first cache device and a second cache device, the method comprising: keeping the cache and the second cache device in an enabled state; labeling the first cache device as a to-be-reduced device so as to block a new data page from being promoted to the first cache device; removing a cached data page from the first cache device; removing cached input output (10) historical information from the first cache device; and removing the first cache device from the cache.

Although specific embodiments are illustrated in the figures by way of example, it should be understood that depiction of the particular embodiments herein is not intended to limit the embodiments to the disclosed specific forms.

BRIEF DESCRIPTION OF THE ACCOMPANYING DRAWINGS

The objectives, advantages, and other features will become more apparent from the disclosure and claims below. Herein, non-limiting depiction of some embodiments will be provided only for illustrative purposes with reference to the accompanying drawings, in which:

FIG. 1 schematically shows a general view of block data path software stack in a storage system;

FIG. 2 shows a structural example of a fast cache;

FIG. 3, which incorporates FIGS. 3A and 3B, shows a schematic diagram of a process for reducing a cache device;

DETAILED DESCRIPTION OF THE EMBODIMENTS

Hereinafter, some details are descried for the purpose of illustration. However, a person of normal skill in the art will be aware that embodiments of the present disclosure will be implemented without these specific details. Therefore, the present disclosure is not intended to be limited to the illustrated embodiments; instead, it is granted a broadest scope consistent with the principles and features described herein.

It should be understood that terms "first" and "second" are only used for distinguishing one element from another. In actuality, a first element can also be referred to as a second element, vice versa. In addition, it should also be understood that terms of "comprise" and "include" are only used to state existence of the features, elements, functions or components as stated, but do not exclude existence of one or more other features, elements, functions or components.

For ease of explanation, the embodiments of the present disclosure will be described herein based on an example of flash disk-based fast cache. However, as can be understood by those skilled in the art, the embodiments of the present disclosure are definitely not limited to application scenarios using such a cache.

Typically, Cache is a component in a storage system. Generally, a component improves system performance by transparently storing data in a cache medium (e.g., a Flash disk). As an example of the cache, a flash disk cache can provide fast cache and has a higher performance than a hard disk driver (HDD).

Figure 1:
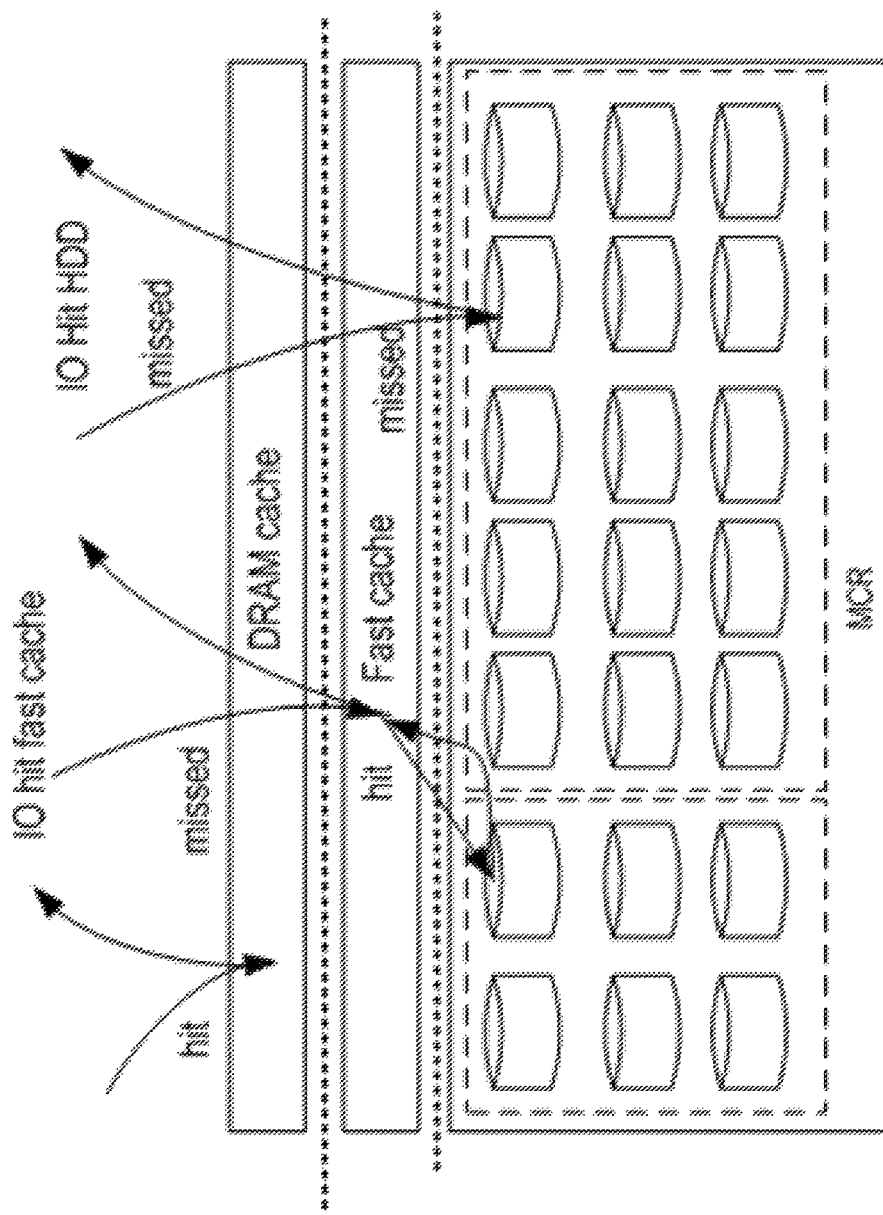

For example, traditionally, the fast cache is a $2^{nd}$-layer cache in VNX serial products (e.g., VNX2, VNXe) of EMC™. Typically, in a storage system, a general view of a block data path software stack is schematically shown in FIG. 1. As shown in FIG. 1, when an input output (I/O) request from a host arrives at a storage system (e.g., disk array), there are possibly two types of cache hits:

1. Dynamic random access memory (DRAM) cache hit: the DRAM cache will firstly search all data cached therein; if the DRAM cache search hits, i.e., data corresponding to the IO request have already been cached in the DRAM, then the DRAM cache will use the cached data to respond to the IO request from the host; if the DRAM cache search misses, the IO request will be forwarded to the fast cache, e.g., flash disk cache.

2. Fast cache hit: when the DRAM forwards the IO request to the fast cache, the fast cache will search data cached therein. If the search hits, the fast cache will use the cached data to respond to the IO request; if the search misses, i.e., data corresponding to the IO request is not found in the fast cache, the fast cache may forward the IO request to a HDD matrix, for reading corresponding data from the HDD.

In the example, only when both of the DRAM cache and the fast cache miss in the search, will the user's IO request be forwarded to the HDD (e.g., independent disk redundant array (RAID), multi-core RAID (MCR)), and data are read from or written to the HDD.

A first aspect of the present disclosure provides a method of online reducing cache devices from a cache, the cache including a first cache device and a second cache device, the method comprising: keeping the cache and the second cache device in an enabled state; labeling the first cache device as a to-be-reduced device so as to block a new data page from being promoted to the first cache device; removing a cached data page from the first cache device; removing cached input output (IO) historical information from the first cache device; and removing the first cache device from the cache.

In one embodiment, the cache may include a cache page Hash table that has a first link to a cached data page in the first cache device and a second link to a cached data page in the second cache device; and wherein keeping the cache and the second cache device in an enabled state comprises keeping the second link; wherein removing the cached data page from the first cache device comprises disconnecting the first link and flushing the cached data page in the first cache device to another storage device than the cache.

In another embodiment, the cache may comprise a cache page hash table that has a third link to a shadow page cached in the first cache device and a fourth link to a cached shadow page in the second cache device; the shadow pages have IO historical information of corresponding cache devices; and wherein keeping the cache and the second cache device in an enabled state comprises keeping the fourth link; wherein removing the cached IO historical information from the first cache device comprises disconnecting the third link and removing the shadow page cached in the first cache device.

In another embodiment, the cache may comprise a cache page hash table that has a fifth link to cache page metadata in the first cache device and a sixth link to cache page metadata in the second cache device; the cache page metadata store a mapping relationship between a data page cached in a corresponding cache device and a data page cached in another storage device than the cache; and wherein keeping the cache and the second cache device in an enabled state comprises keeping the sixth link; wherein removing the cached data page from the first cache device comprises disconnecting the fifth link and removing the cache page metadata in the first cache device.

In one embodiment, the cache may comprise a global shadow list that has a seventh link to a shadow page cached in the first cache device and an eighth link to a shadow page cached in the second cache device; the shadow pages having IO historical information of the corresponding cache devices; and wherein keeping the cache and the second cache device in an enabled state comprises keeping the eighth link; wherein removing the cached IO historical information from the first cache device comprises disconnecting the seventh link and removing the shadow page cached in the first cache device.

In another embodiment, the method may further comprise: releasing a memory for the first cache device and returning the memory to a RAM managing unit, after removing the cached data page and the cached IO historical information from the first cache device.

In another embodiment, one of the first cache device and the second cache device comprises a pair of solid-state disk (SSD). In another embodiment, the other storage device than the cache may comprise a hard disk driver (HDD).

In one embodiment, the method may further comprise: searching the cache for an IO request during reducing a cache device from the cache, and if the first cache device has been labeled as a to-be-reduced device and it is found through search that a first data page associated with the IO request is cached in the first cache device, reading the first data page from the first cache device and transmitting a response to an upper layer.

In another embodiment, the method may further comprise: searching the cache for an IO request during reducing a cache device from the cache, and if the first cache device has been labeled as a to-be-reduced device and times of the search hitting a shadow page of the first cache device reaches a promotion threshold, wherein the shadow page has IO historical information of the first cache device, promoting the data associated with the IO request to the cache using an idle page in another cache device that is unlabeled as the to-be-reduced device in the cache.

In another embodiment, promoting the data associated with the IO request to the cache using an idle page in another cache device that is unlabeled as the to-be-reduced device in the cache includes: adding the data associated with the IO request into a promotion queue; searching, in the cache, a cache device that is unlabeled as a to-be-reduced device and has an idle page; obtaining to-be-promoted data from the promotion queue according to a predetermined sequence; and promoting the obtained data to the cache using the searched cache device.

A second aspect of the present disclosure provides an apparatus for online reducing cache devices from a cache, the cache including a first cache device and a second cache device, the apparatus comprising: an enable-keeping unit configured to keep the cache and the second cache device in an enabled state; a labeling unit configured to label the first cache device as a to-be-reduced device so as to block a new data page from being promoted to the first cache device; a data page removing unit configured to remove a cached data page from the first cache device; a historical information removing unit configured to remove cached input output (IO) historical information from the first cache device; and a cache device removing unit configured to remove the first cache device from the cache.

In one embodiment, the cache may include a cache page Hash table that has a first link to a cached data page in the first cache device and a second link to a cached data page in the second cache device; and the enable-keeping unit may be configured to keep the second link; the data page removing unit may be configured to disconnect the first link and flush the cached data page in the first cache device to another storage device than the cache.

In another embodiment, the cache may comprise a cache page hash table that has a third link to a shadow page cached in the first cache device and a fourth link to a shadow page cached in the second cache device; the shadow pages having IO historical information of corresponding cache devices;

and the enable-keeping unit may be configured to keep the fourth link; and the historical information removing unit may be configured to disconnect the third link and remove the shadow page cached in the first cache device.

In another embodiment, the cache may comprise a cache page hash table that has a fifth link to cache page metadata in the first cache device and a sixth link to cache page metadata in the second cache device; the cache page metadata store a mapping relationship between a cached data page in a corresponding cache device and a cached data page in another storage device than the cache; and the enable-keeping unit may be configured to keep the sixth link; the data page removing unit may be configured to disconnect the fifth link and remove the cache page metadata in the first cache device.

In one embodiment, the cache may comprise a global shadow list that has a seventh link to a shadow page cached in the first cache device and an eighth link to a shadow page cached in the second cache device; the shadow pages having IO historical information of the corresponding cache devices; and the enable-keeping unit may be configured to keep the eighth link; the historical information removing unit may be configured to disconnect the seventh link and remove the shadow page cached in the first cache device.

In another embodiment, the apparatus may further comprise: a memory releasing unit configured to release a memory for the first cache device and return the memory to a memory managing unit, after the data page removing unit removes the cached data page from the first cache device and the historical information removing unit removes the cached IO historical information from the first cache device.

In one embodiment, one of the first cache device and the second cache device comprises a pair of solid-state disk (SSD). In another embodiment, the other storage device than the cache may comprise a hard disk driver (HDD).

In another embodiment, the apparatus may further comprise: a searching unit configured to search the cache for an IO request during reducing a cache device from the cache, and a hit processing unit configured to read a first data page from the first cache device and transmit a response to an upper layer, if the first cache device has been labeled as a to-be-reduced device and it is found through search that the first data page associated with the IO request is cached in the first cache device.

In another embodiment, the apparatus may further comprise: a searching unit configured to search the cache for an IO request during reducing a cache device from the cache, and a hit processing unit configured to: promote the data associated with the IO request to the cache using an idle page in another cache device that is unlabeled as the to-be-reduced device in the cache, if the first cache device has been labeled as a to-be-reduced device and times of the search hitting the shadow page of the first cache device reaches a promotion threshold, wherein the shadow page has IO historical information of the cache device.

In another embodiment, the hit processing unit may further comprise: a queuing unit configured to add the data associated with the IO request into a promotion queue; an idle page searching unit configured to search, in the cache, a cache device that is unlabeled as a to-be-reduced device and has an idle page; a scheduling unit configured to obtain to-be-promoted data from the promotion queue according to a predetermined sequence; and a promoting unit configured to promote the obtained data to the cache using the searched cache device.

A third aspect of the present disclosure provides a storage system, comprising any apparatus according to the second aspect.

According to the method or apparatus in the embodiments of the present disclosure, during removing a cache device from the cache, most of the cached hot data are still maintained in the cache; then the IO to the cache will be accomplished at an almost identical cache hit ratio. Therefore, there is little impact on the hit ratio and performance of fast cache.

Figure 2:
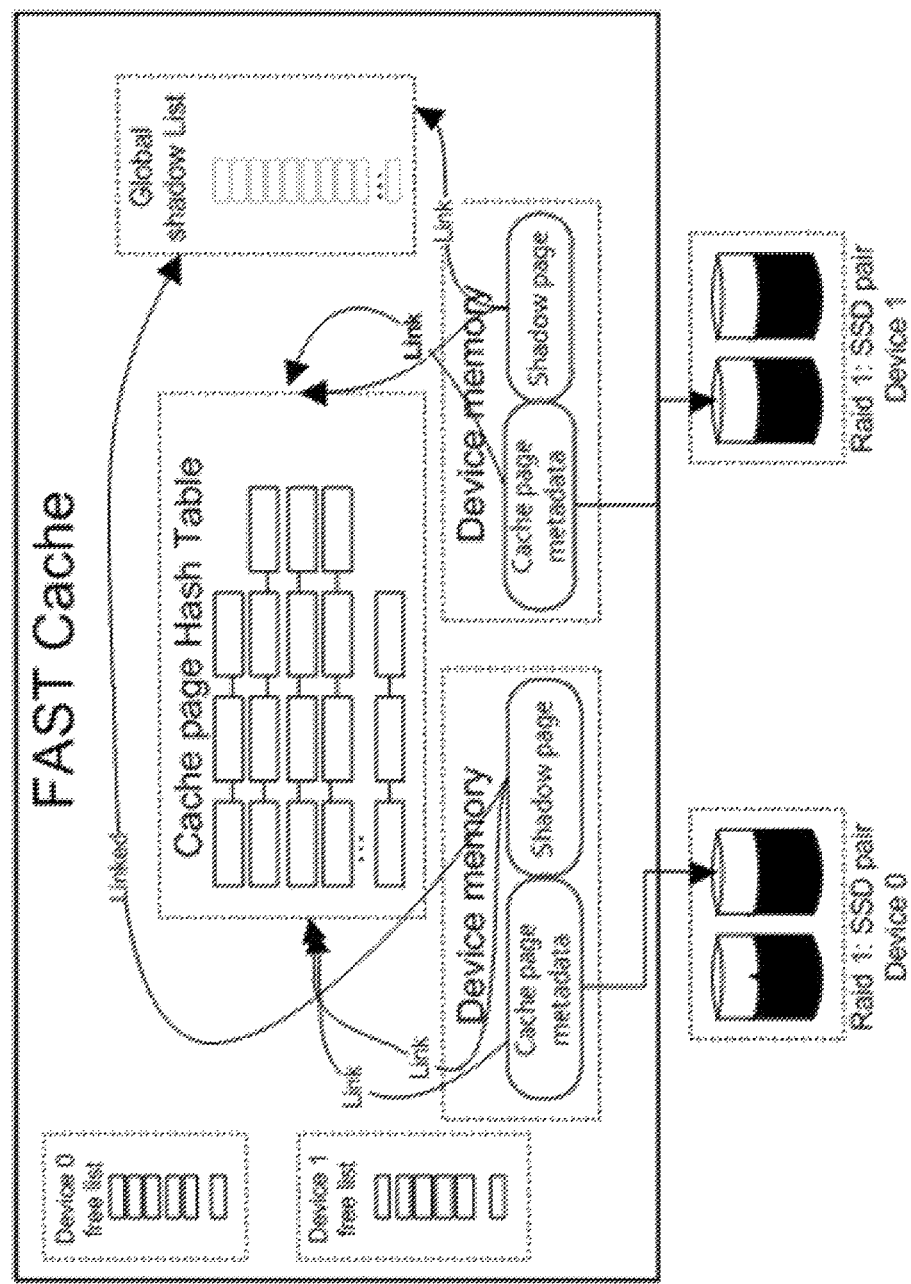

FIG. 2 shows a structural diagram of a fast cache. As shown in FIG. 2, in the example structure, the fast cache includes a cache device 0 and a cache device 1. RAIDs 1 configured with a pair of solid-state disk (SSD) are provided to the fast cache as a RAID group. The fast cache will process this pair of SSD disks as one device (cache device 0 or cache device 1). The cache device 0 and the cache device 1 may be used for storing user's hot data.

Each cached data page has corresponding metadata. The metadata may store mapping information between a data page in the SSD and a data page in, for example, an HDD, and indicate whether the data page is dirty, wherein the page is a unit for data storage. If the data page in the SSD is a data page which has been copied and the data page in the SSD is the latest, it is believed that the data page is dirty.

Each cache device in FIG. 2 can cache a certain amount of data pages, e.g., can cache N pages. Therefore, the fast cache will assign N shadow pages for tracking IO historical information that is not stored in the SSD. As shown in FIG. 2, suppose the cache device 0 can cache N pages, and it is assigned N cache pages metadata and N shadow pages. Similarly, the other cache device in the fast cache also has its own cached data pages and shadow pages. The data pages, data page metadata, and shadow pages of all devices may be linked to a cache page hash table, while the shadow pages of all devices may be similarly linked to a global shadow list. The cache page hash table and the global shadow list are used for mapping key values to corresponding positions so as to access the data page or shadow page records.

In addition, as shown in FIG. 2, the cache may also have an idle list for each cache device to indicate idle pages in the corresponding cache device.

According to a prior fast cache design, when a user wants to delete a certain cache device (e.g., SSD) from the fast cache because the cache device is not sufficiently utilized, the user has to destroy the fast cache and then rebuilds the fast cache using less cache devices. This design means that hot data in the fast cache will be lost when a certain cache device is deleted; and after the fast cache is rebuilt, a long time needs to be taken for pre-warming before restart. Therefore, during deletion/creation of the fast cache, the fast cache cannot be used, and a user cannot obtain any benefit from the fast cache. Even worse, this process will affect the overall performance of a storage system (e.g., an array), because more internal IOs will be generated during the deleting/creating/pre-warming processing of the fast cache, which decreases the resources for external IO processing.

Figure 3A:
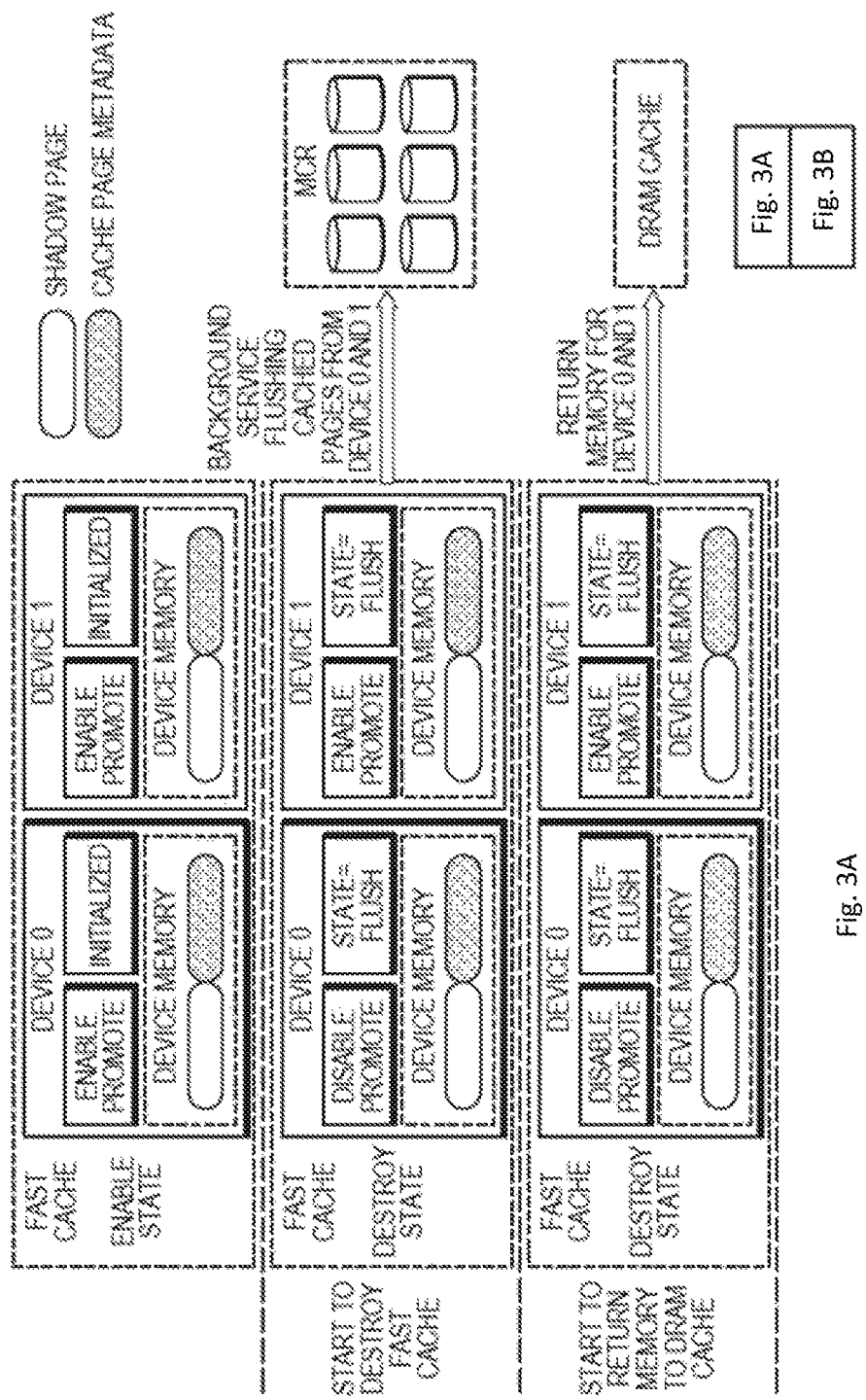

FIG. 3, which incorporates FIGS. 3A and 3B, shows an example of a processing procedure for reducing cache devices according to a prior design. As shown in FIG. 3, removing the cache device 1 will have to destroy an entire cache. That is, although only the cache device 1 is to be reduced, the cache device 0 will also be affected and cannot work. As shown in FIG. 3, in order to remove the cache device 1, the cache will be first set to a destroyed state, and then cached data pages in the cache device 0 and cache device 1 will be flushed into an HDD (e.g., MCR). Afterwards, a memory for the two cache devices will be returned to a DRAM cache. Then the cache is rebuilt using the cache device 0. When the cache has just been built, the cache device 0 cannot be used immediately, until completion of the pre-warming procedure. For example, it is needed to re-request a memory for the cache device 0 from the DRAM. The procedure of destroying and rebuilding will seriously affect the overall performance of the storage system.

In order to solve at least some of the above problems, the present disclosure provides a method and apparatus for online reducing cache devices from a cache.

Figure 4A:
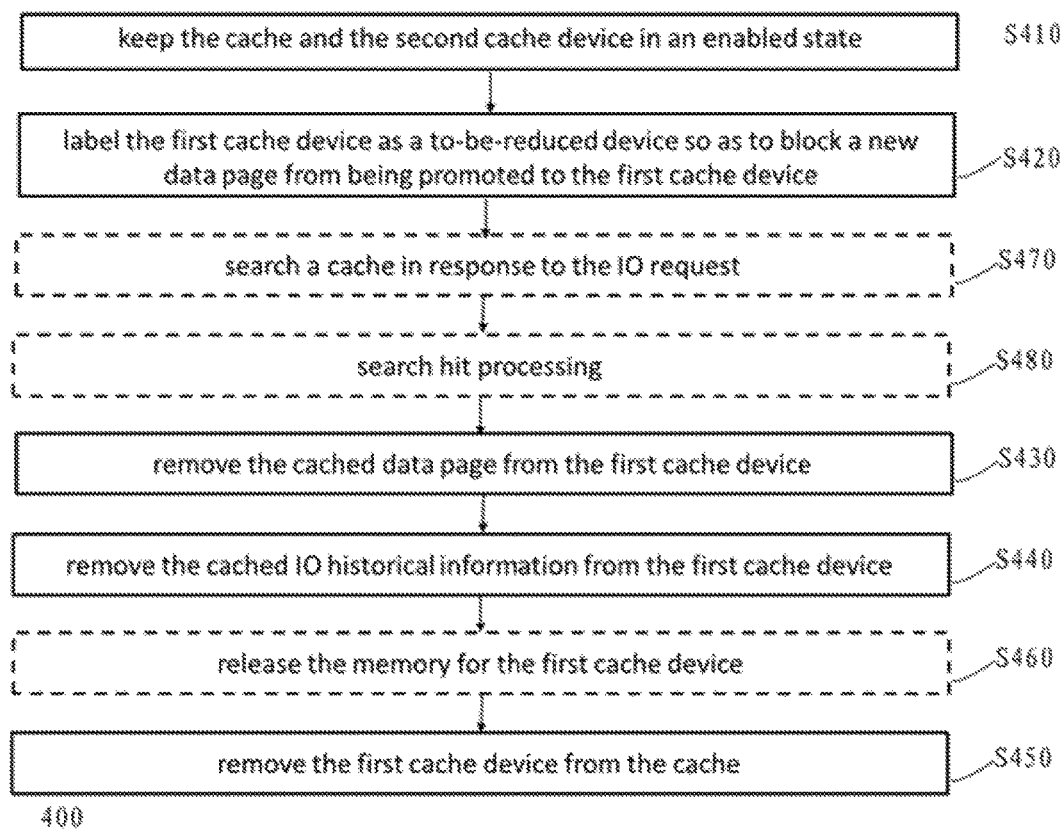
FIGS. 4a-4b show a flow diagram of an example method of online reducing a cache device according to an embodiment of the present disclosure.

Now, refer to FIG. 4a, in which a flow chart of a method of online reducing cache devices according to the embodiments of the present disclosure is presented. The method may be used for online removing a cache device from the fast cache shown in FIG. 1 or FIG. 2, while maintaining the fast cache in a serving state (i.e., an enabled state). It can be understood that the embodiments of the present disclosure are not limited to removing a cache device from the specific fast cache shown in FIG. 1 and FIG. 2; instead, they may be applied more broadly to remove a cache device from any cache that includes at least a first cache device and a second cache device.

As shown in FIG. 4a, the method comprises: keeping the cache and the second cache device in an enabled state (S410); labeling a first cache device as a to-be-reduced device so as to block a new data page from being promoted to the first cache device (S420); removing a cached data page from the first cache device (S430); removing cached input output (IO) historical information from the first cache device (S440); and removing the first cache device from the cache (S450).

With embodiments of the method 400 of the present disclosure, a cache device can be removed without affecting other cache devices of the cache, obviating a need of destroying the entire cache and then rebuilding it. Therefore, according to the embodiments of the present disclosure, the overall performance of the storage system can be enhanced and user experience can be improved.

It is to be understood that the embodiments of the present disclosure are not limited to removing a single cache device from the cache; instead, it can remove a plurality of cache devices using a similar principle. In addition, in some embodiments of the present disclosure, the cache may comprise other cache devices than the first cache device and the second cache device, and except the cache device being reduced, other cache devices might not be affected during the process of reducing the cache device.

In one embodiment, the first cache device or the second cache device in the cache may comprise one or more pairs of SSDs. However, it can be understood that the embodiments of the present disclosure are not limited thereto. Actually, implementation of the embodiments of the present disclosure is not limited to a cache device of any specific structure.

In one embodiment, the cache may be a fast cache like what is shown in FIG. 2. For example, the cache may comprise a cache page hash table that has a first link to a data page cached in the first cache device and a second link to a data page cached in the second cache device. In the embodiment, the method 400 may comprise: keeping a second link at the block S410 so as to keep the cache and the second cache device in an enabled state; in addition, at block S430, the first link may be disconnected, and the data page cached in the first cache device may be flushed to another storage device (e.g., HDD, MCR) other than the cache.

In another embodiment, alternatively or additionally, the cache may comprise a cache page hash table that has a third link to a shadow page cached in the first cache device, and a fourth link to a shadow page cached in the second cache device, wherein the shadow pages has IO historical information of corresponding cache devices. In this embodiment, the method 400 may include keeping the fourth link at block S410 so as to keep the cache and the second cache device in an enabled state; in addition, at block S440, a third link may be disconnected, and the shadow page (i.e., corresponding IO historical information) cached in the first cache device is removed.

In a further embodiment, similarly, the cache may comprise a cache page hash table that has a fifth link to cache page metadata in the first cache device, and a sixth link to a cache page metadata in the second cache device; the cache page metadata stores a mapping relationship between the data page cached in a corresponding cache device and a data page stored in another storage device (e.g., HDD, MCR). In the embodiment, the method 400 may comprise keeping the sixth link at block S410; in addition, at block S430, the fifth link may be disconnected, and the cache page metadata in the first cache device is removed.

In another embodiment, assuming that the cache includes a global shadow list similar as that shown in FIG. 2, global shadow list having a seventh link to a shadow page cached in the first cache device and an eighth link to the shadow page cached in the second cache device; the shadow page has IO historical information of a corresponding cache device. In the embodiment, the method 400 may comprise keeping the eighth link at the block S410; in addition, at block S440, the seventh link may be disconnected to remove the shadow page cached in the first cache device.

In a further embodiment, the method 400 may comprise: releasing (S460) a memory (e.g., RAM) for the first cache device, and returns the memory to a memory managing unit, after removing the cached data page and the cached IO historical information from the first cache device. This embodiment enables re-allocation of the memory occupied by the first cache device, thereby enhancing utilization of the memory.

With the embodiment of the method 400 of the present disclosure, during reduction of cache devices, the cache is still in an enabled state and can serve user IO. Therefore, in one embodiment, the method 400 may further comprise performing IO processing during reducing a cache device from the cache. For example, the method 400 may comprise: searching (S470) the cache for an IO request during reducing a cache device from the cache; if the first cache device has been labeled as a to-be-reduced device and it is found through the search that a first data page associated with the IO request is cached in the first cache device, then reading, from the first cache device, the first data page and transmitting a response (S480) to an upper layer.

When the first cache device is labeled as a reduced device while its cached page(s) has not been flushed, the search hit likely occurs. When flushing of the cache page in the first cache device is being performed, with more and more cache pages being flushed and with the metadata of the cached data page are gradually flushed from the fast cache hash table, the possibility of a search hitting a cache data page in the first cache device will be decreased. When the cache data pages of the first cache device are completely flushed, this means the fast cache hash table does not have a link to the cache data page of the cache device anymore, and the user IO will not hit the first cache device any longer.

Alternatively or additionally, in another embodiment, if the first cache device has been labeled as to-be-reduced device and the search in block S470 hits a shadow page of the first cache device and the number of hits reaches a promotion threshold, then data associated with the IO request may be promoted to the cache (S480) using an idle page of another cache device (e.g., the second cache device) that is unlabeled as a to-be-reduced device in the cache. As previously mentioned, the shadow page has IO historical information of the first cache device. As the first cache device's shadow page starts being removed from the global shadow list, the opportunity of search hitting the shadow page in the first cache device being reduced will be lowered. When the first cache device's entire shadow page is removed from the global shadow list, there will be no opportunity to make the user IO hit a shadow element in the first cache device.

Figure 4B:
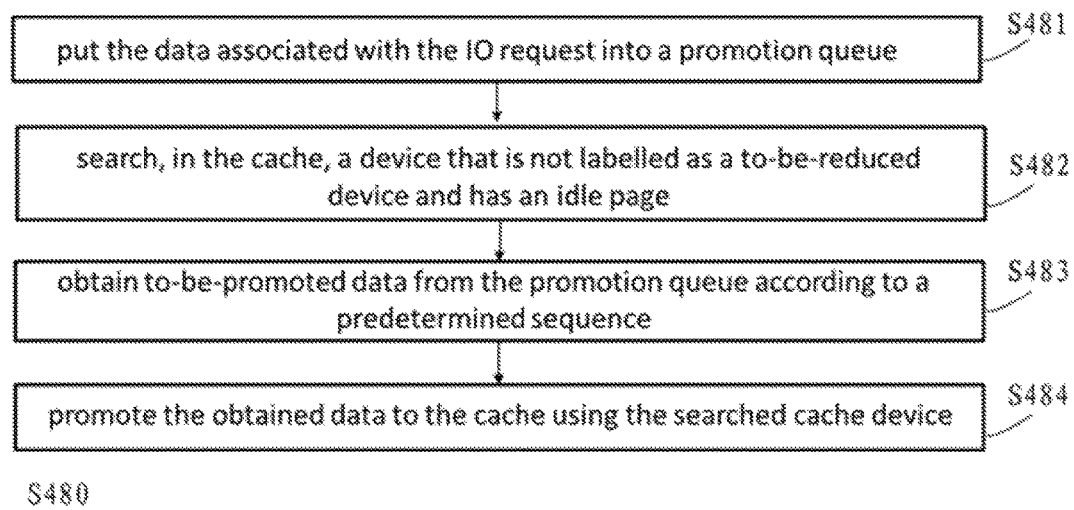

FIG. 4b shows an example embodiment of the operation at the block S480. As illustrated in FIG. 4b, block S480 may comprise:

At block S481, adding the data associated with the IO request in a promotion queue;

At block S482, searching, in the cache, a cache device that is unlabeled as a to-be-reduced device and has an idle page;

At block S483, obtaining to-be-promoted data from the promotion queue according to a predetermined sequence; and At block S484, promoting the obtained data to the cache using the searched cache device.

It should be noted that the embodiments of the present disclosure are not limited to any specific implementation to carry out the hit processing at block S480. For example, the data promoting process is not necessarily based on a queue; instead, a priority of data promotion may be determined based on other factors. In addition, in some embodiments, the idle page search at block S482 may also be omitted; instead, the data will be promoted to a predetermined cache device.

Figure 5:
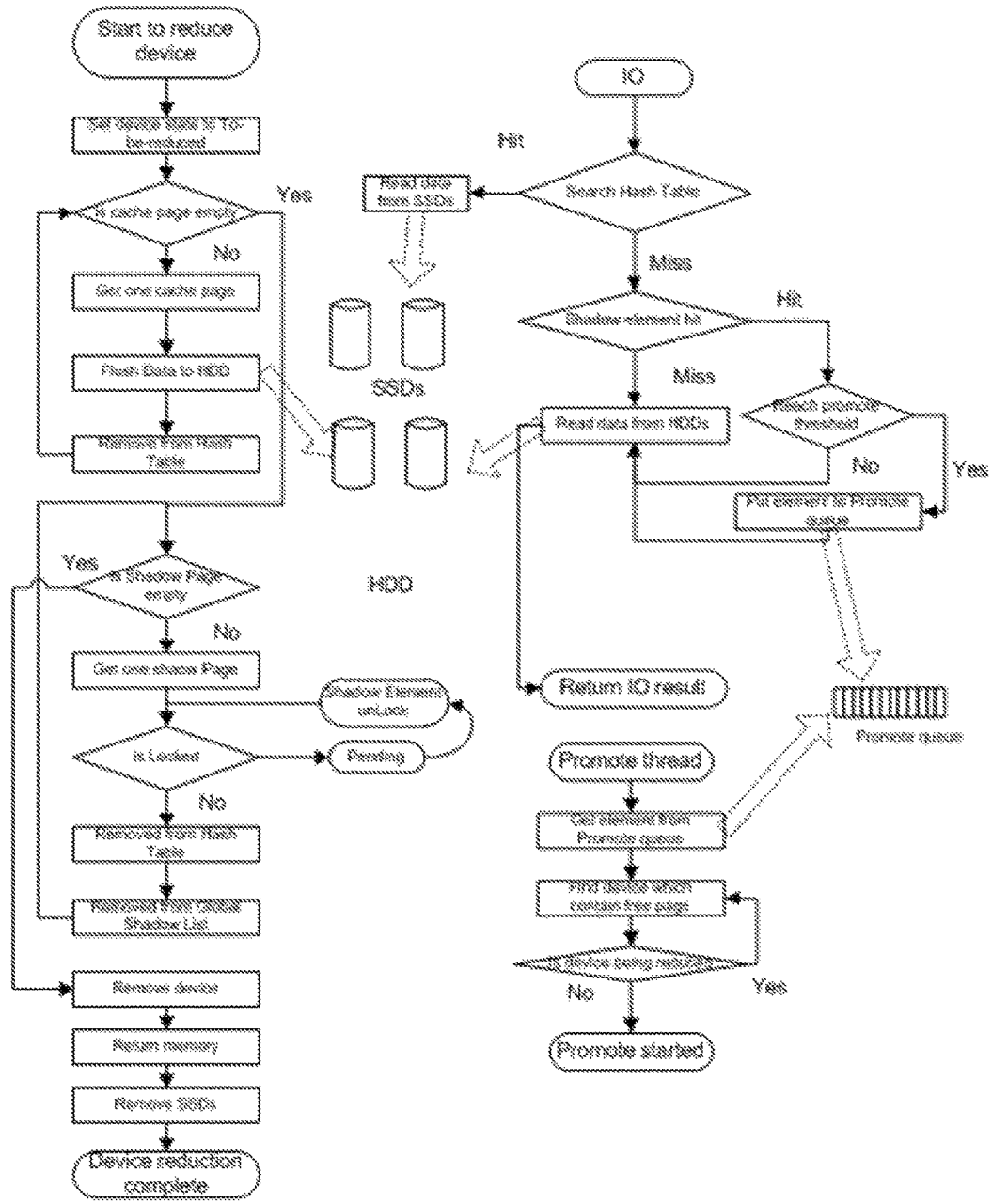
FIG. 5 shows a flow diagram of executing reduction of a cache device, IO processing, and data promotion according to one embodiment of the present disclosure.

FIG. 5 shows a flow of performing reduction of cache devices, IO processing, and data promotion, as well as relationships between respective operations according to one embodiment of the present disclosure. As shown in the left side of FIG. 5, when a cache device in the cache starts to be reduced, a state of the to-be-reduced device may be set as "to be reduced," or "to be removed," so as to avoid promoting new data pages to the cache device. State of the device may be a newly added attribute for the device object. When a cache device is labeled as a to-be-reduced device, the cached data page therein may be moved into the HDD, till the cache data page is empty. Afterwards, a link to the cache data page may be disconnected from the cache hash table, i.e., removing the cache data page from the cache hash table. As shown in FIG. 5, similar processing may be performed to the shadow page in the cache device, i.e., removing the shadow page from the hash table and the global shadow list. Then, the cache device may be removed from the cache. Moreover, a memory corresponding to the cache device may be returned to a memory managing unit and the SSD in the cache device may be removed.

Because the cache still works during reducing a cache device, the upper right portion of FIG. 5 also shows an example flow of performing IO to the cache. The flow comprises finding whether a cache page in the cache is hit by searching a hash table. Moreover, when hitting a shadow page, determine whether to promote corresponding data to the cache based on the times of hits.

The lower right portion of FIG. 5 shows a specific example of promoting corresponding data to the cache. In this example, a promotion queue is utilized. This operation is similar to the flow shown in FIG. 4b, which will not be detailed here.

Figure 6:
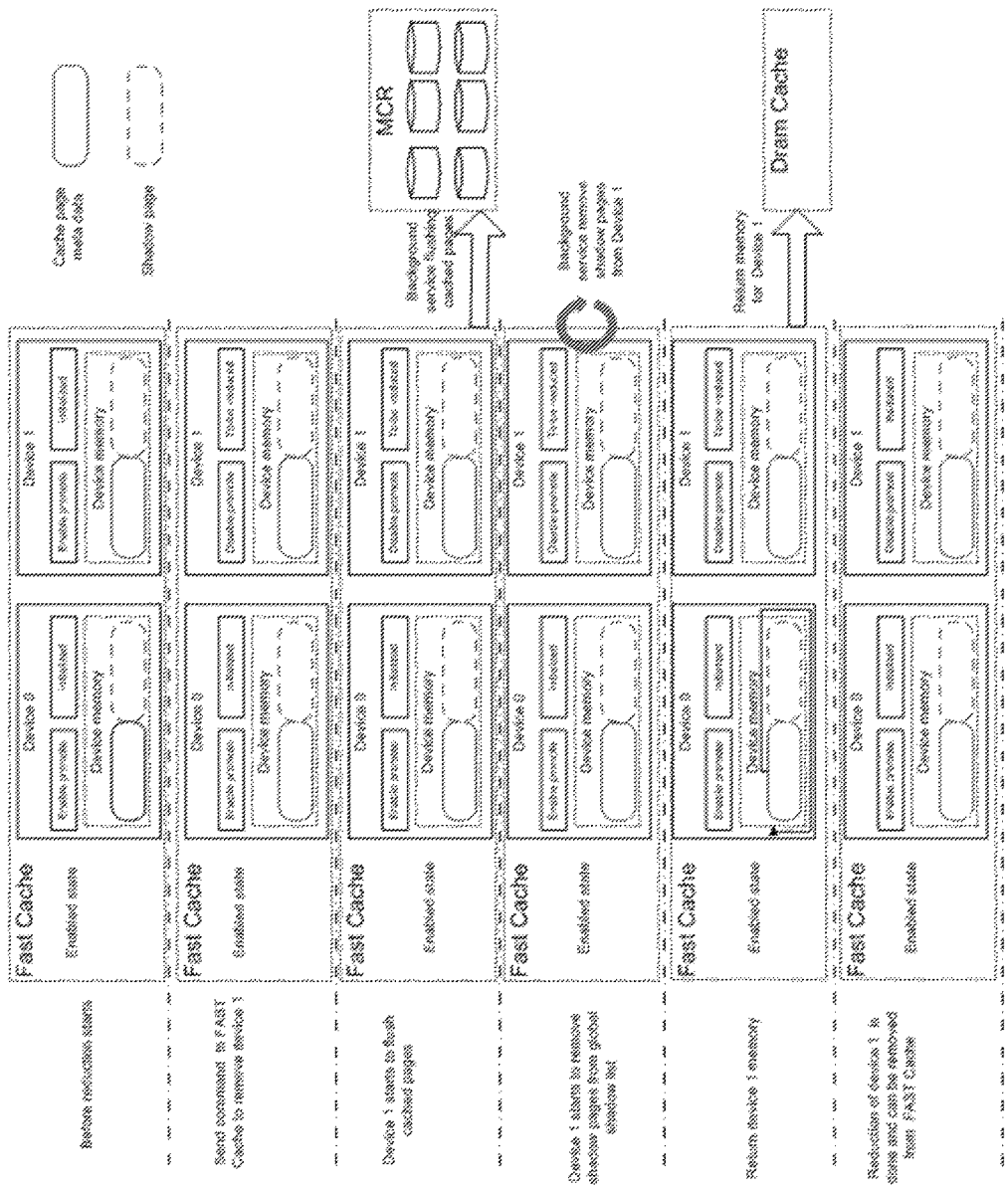
FIG. 6 shows a schematic diagram of a procedure for online reducing a cache device according to an embodiment of the present disclosure.

FIG. 6 shows state changes of the cache and the cache devices therein when reducing a cache device from the cache according to one embodiment of the present disclosure. As shown in FIG. 6, during reducing a cache device, the state of the device 1 is labeled as "to be reduced," while the cache is always in an enabled state, which forms a distinct contrast with the states shown in FIG. 3. Another difference from FIG. 3 lies in that in FIG. 6, only cache pages associated with the "to-be-reduced" device (device 1 in this example) are flushed to the MCR, without affecting the cached data of another cache device (device 0 in this example). In other words, the status of another cache device is maintained unchanged. For example, during the device 1 is being reduced, data can still be promoted to device 0.

In prior implementation of fast cache, there is no such an option of reducing a cache device. If the user finds that the fast cache has subscribed too many SSDs, then this fast cache needs to be disabled/deleted, and re-build using less SSDs. This is a destructive procedure, which will degrade the performance of the system. However, by using the solution of reducing a cache device according to the present disclosure, reducing the device from a cache (e.g., a fast cache) is performed online, which is not a destructive procedure and has little impacts on the performance of the array.

Figure 7:
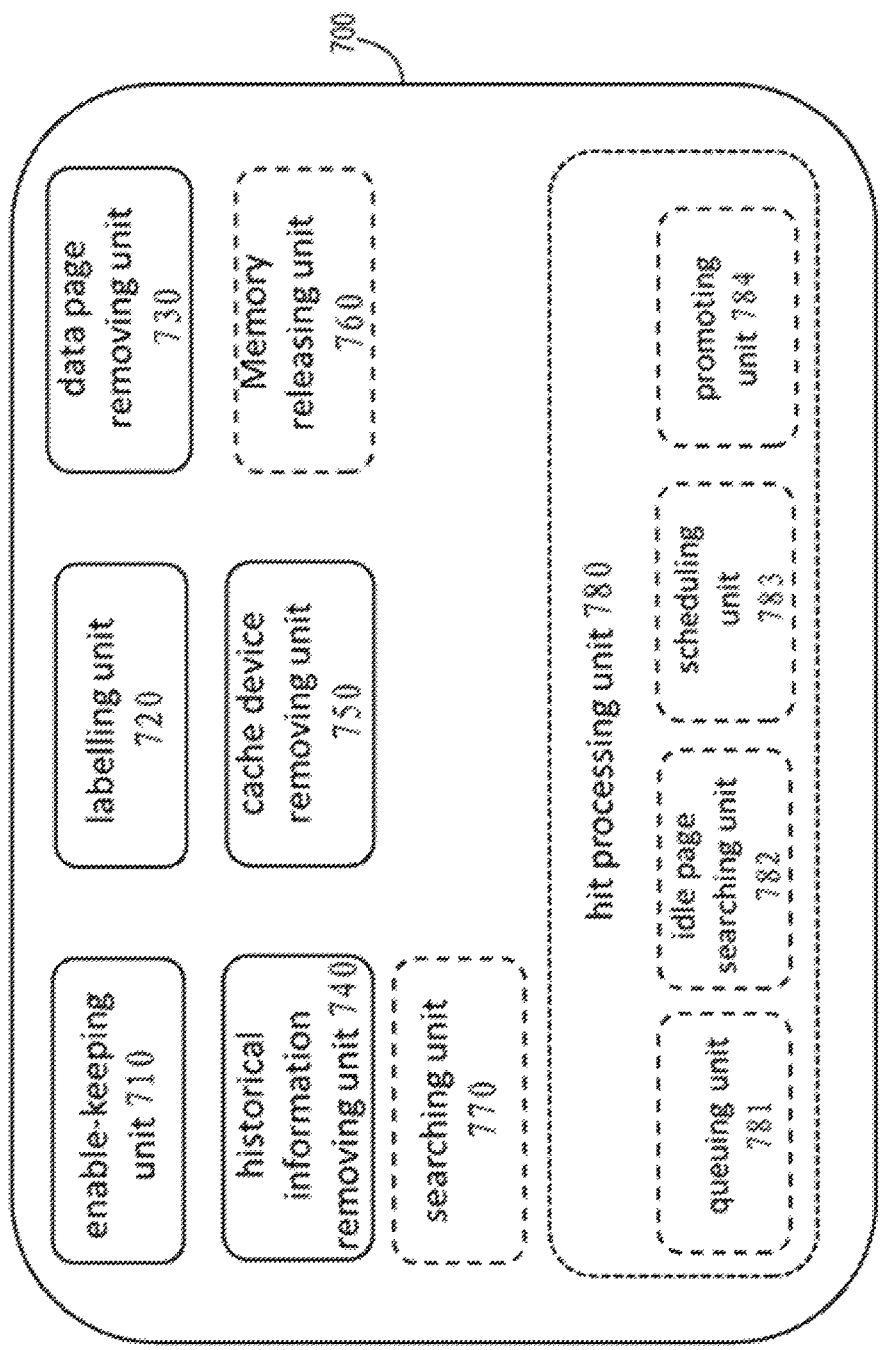
FIG. 7 shows a structural diagram of an apparatus for online reducing a cache device according to an embodiment of the present disclosure.

FIG. 7 shows an example structure diagram of an apparatus 700 according to the embodiments of the present disclosure. The apparatus 700 is for online reducing a cache device from the cache. In one embodiment, the apparatus may be implemented as a component in a storage system. The apparatus is operable for carrying out the method 400 described with reference to FIGS. 4a-6 and any other processing and method. It should be understood that the method 400 is not limited to being executed by the apparatus 700; at least some blocks of the method 400 may also be carried out by other apparatus or entity.

Suppose the cache at least comprises a first cache device and a second cache device. In one embodiment, the apparatus 700 comprises an enable-keeping unit 710 configured to keep the cache and the second cache device in an enabled state; a labeling unit 720 configured to label the first cache device as a to-be-reduced device so as to block a new data page from being promoted to the first cache device; a data page removing unit 730 configured to remove the cached data page from the first cache device; a historical information removing unit 740 configured to remove the cached input output (IO) historical information from the first cache device; and a cache device removing unit 750 configured to remove the first cache device from the cache.

In one embodiment, units 710-750 can be configured to perform operations of blocks S410-S450 of the method 400 described with reference to FIGS. 4a-6, respectively. Therefore, the depiction about blocks S410-S450 are likewise applicable to units 710-750. Therefore, specific details will not be repeated.

In another embodiment, the apparatus 700 may further comprise: a memory releasing unit 760 configured to release a memory for the first cache device and return the memory to a memory managing unit, after the data page removing unit removes the cached data page from the first cache device and the historical information removing unit removes the cached IO historical information from the first cache device.

Alternatively or additionally, in another embodiment, the apparatus 700 may comprise a searching unit 770 configured to search the cache for an IO request during reducing a cache device from the cache, and a hit processing unit 780 configured to, if the first cache device has been labeled as a to-be-reduced device and it is found through the search that the first data page associated with the IO request is cached in the first cache device, read the first data page from the first cache device and transmit a response to an upper layer.

In one embodiment, the hit processing unit 780 may also be configured to: if the first cache device has been labeled as a to-be-reduced device and times of the search hitting the shadow page of the first cache device reaches a promotion threshold, wherein the shadow page has IO historical information of the cache device, promote the data associated with the IO request to the cache using an idle page in another cache device that is unlabeled as a to-be-reduced device in the cache.

Only as an example, the hit processing unit 780 may further comprise: a queuing unit 781 configured to add the data associated with the IO request into a promotion queue; an idle page searching unit 782 configured to search, in the cache, a device that is unlabeled as a to-be-reduced device has an idle page; a scheduling unit 783 configured to obtain to-be-promoted data from the promotion queue according to a predetermined sequence; and a promoting unit 784 configured to promote the obtained data to the cache using the searched cache device. However, the embodiments of the present disclosure are not limited to any specific embodiments to implement the hit processing unit 780. For example, the promoting procedure is not necessarily based on a queue; instead, priority of data promotion may be determined based on other factors. In addition, in some embodiments, the idle page searching unit 782 may also be omitted; instead, the data are promoted to a predetermined cache device.

It is to be understood that the apparatus 700 may also comprise other units that are not shown in FIG. 7.

Embodiments of the present disclosure can achieve at least one of the following advantages. It is possible to reduce a cache device in an online fashion without affecting the cache to serve user IO. Moreover, the procedure of reducing a cache device is not destructive, and has little impacts on the storage system. In addition, internal 10 is reduced and the overall performance is enhanced.

It would be appreciated that the blocks or steps in the above method may be executed by a programmed computer. In the present disclosure, some embodiments also intend to cover a program storage device, e.g., a digital data storage medium, which is machine or computer-readable and coded machine-executable or computer-executable instruction programs, wherein the instruction performs some or all steps of the method above. The program storage device may be, for example, a digital memory, a magnetic storage medium such as a disk and a tape, a hard disk driver or an optical-readable digital data storage medium. The embodiment also intends to cover a computer programmed to execute steps of the method above.

Functions of various elements of the apparatus as shown in the drawings may be provided by software, dedicated hardware, or hardware associated with appropriate software and capable of executing the software, or a firmware, or a combination thereof. In one embodiment, there is provided an apparatus comprising a memory and a processor. The memory comprises instructions. When the instructions are executed by the processor, the apparatus is operable to perform any method as described with reference to FIGS. 4a-6. Functions of the processor therein may be provided by a single dedicated processor, a single shared processor, or a plurality of individual processors. Besides, the term "processor" may include, but not limited to, digital signal processor (DSP) hardware, network processor, an application-specific integrated circuit (ASIC), a field programmable gate array (FPGA), a read-only memory (ROM) for storing software, a random access memory (RAM) and a nonvolatile memory. It may also comprise other conventional and/or customized hardware.

In one embodiment of the present disclosure, there further provides a storage system comprising any apparatus described with reference to FIG. 7.

Those skilled in the art should understand that the specification and drawings are only for illustrating the principle of the present disclosure. Therefore, it should be understood that those skilled in the art will be capable of designing various arrangements, that although not explicitly described or illustrated here, embody the principle of the present disclosure and are included within the spirit and scope of the present disclosure. Besides, all examples as illustrated here are mainly for teaching purposes so as to help readers to understand the principle of the present disclosure and those concepts contributed by the inventor of the present disclosure, and should be construed as not being limited to the specific examples and conditions illustrated here. Moreover, all descriptions and specific examples for illustrating the principle, aspect and embodiments of the present disclosure are also intended to include their equivalents.

We claim:

1. A method of online reducing cache devices from a cache, the cache including a first cache device and a second cache device, the method comprising:
    keeping the cache and the second cache device in an enabled state;
    labeling the first cache device as a to-be-reduced device to block a new data page from being promoted to the first cache device;
    searching the cache for an IO request during a reduction of a cache device from the cache;
    if the first cache device has been labeled as a to-be-reduced device and times of the search hitting a shadow page of the first cache device reaches a promotion threshold, promoting data associated with the IO request to the cache using an idle page in a further cache device that is unlabeled as a to-be-reduced device in the cache, the shadow page having IO historical information of the first cache device;
    removing a cached data page from the first cache device;
    removing cached input output (IO) historical information from the first cache device; and
    removing the first cache device from the cache.

2. The method according to claim 1, wherein the cache includes a cache page hash table that has a first link to a cached data page in the first cache device and a second link to a cached data page in the second cache device;
    wherein the keeping the cache and the second cache device in an enabled state comprises keeping the second link; and
    wherein the removing a cached data page from the first cache device comprises disconnecting the first link and flushing the cached data page in the first cache device to a further storage device other than the cache.

3. The method according to claim 1, wherein the cache includes a cache page hash table that has a third link to a first shadow page cached in the first cache device and a fourth link to a second shadow page cached in the second cache device, and the shadow pages have IO historical information of corresponding cache devices;
  wherein the keeping the cache and the second cache device in an enabled state comprises keeping the fourth link; and
  wherein the removing cached IO historical information from the first cache device comprises disconnecting the third link and removing the first shadow page cached in the first cache device.

4. The method according to claim 1, wherein the cache includes a cache page hash table that has a fifth link to cache page metadata in the first cache device and a sixth link to cache page metadata in the second cache device, and the cache page metadata stores mapping relationships between a cached data page in a corresponding cache device and a cached data page in a further storage device other than the cache;
  wherein the keeping the cache and the second cache device in an enabled state comprises keeping the sixth link; and
  wherein the removing cached data page from the first cache device comprises disconnecting the fifth link and removing the cache page metadata in the first cache device.

5. The method according to claim 1, wherein the cache includes a global shadow list that has a seventh link to a first shadow page cached in the first cache device and an eighth link to a second shadow page cached in the second cache device, and the shadow pages have IO historical information of the corresponding cache devices;
  wherein the keeping the cache and the second cache device in an enabled state comprises keeping the eighth link; and
  wherein the removing cached IO historical information from the first cache device comprises disconnecting the seventh link and removing the first shadow page cached in the first cache device.

6. The method according to claim 1, wherein removing cached input output (IO) historical information from the first cache device further comprises:
  after removing the cached data page and the cached IO historical information from the first cache device, releasing a memory for the first cache device; and returning the memory to a memory managing unit.

7. The method according to claim 1, wherein one of the first cache device and the second cache device comprises a pair of solid-state disk (SSD).

8. The method according to claim 2, wherein the further storage device includes a hard disk driver (HDD).

9. The method according to claim 1, further comprising:
  searching the cache for an IO request during a reduction of a cache device from the cache; and
  if the first cache device has been labeled as a to-be-reduced device and it is found through the search that a first data page associated with the IO request is cached in the first cache device, reading the first data page from the first cache device and transmitting a response to an upper layer.

10. The method according to claim 1, wherein the promoting the data associated with the IO request to the cache using an idle page in a further cache device that is unlabeled as the to-be-reduced device in the cache includes:
  adding the data associated with the IO request into a promotion queue;
  searching, in the cache, a cache device that is unlabeled as a to-be-reduced device and has an idle page;
  obtaining to-be-promoted data from the promotion queue according to a predetermined sequence; and
  promoting the obtained data to the cache using the searched cache device.

11. An apparatus for online reducing cache devices from a cache, the cache including a first cache device and a second cache device, the apparatus comprising:
  an enable-keeping unit configured to keep the cache and the second cache device in an enabled state;
  a labeling unit configured to label the first cache device as a to-be-reduced device to block a new data page from being promoted to the first cache device;
  a hit processing unit configured to search the cache for an IO request during a reduction of a cache device from the cache;
  if the first cache device has been labeled as a to-be-reduced device and times of the search hitting a shadow page of the first cache device reaches a promotion threshold, the hit processing unit promoting data associated with the IO request to the cache using an idle page in a further cache device that is unlabeled as a to-be-reduced device in the cache, the shadow page having IO historical information of the first cache device;
  a data page removing unit configured to remove a cached data page from the first cache device;
  a historical information removing unit configured to remove cached input output (IO) historical information from the first cache device; and
  a cache device removing unit configured to remove the first cache device from the cache.

12. The apparatus according to claim 11, wherein the cache includes a cache page Hash table that has a first link to a cached data page in the first cache device and a second link to a cached data page in the second cache device;
  wherein the enable-keeping unit is configured to keep the second link; and
  wherein the data page removing unit is configured to disconnect the first link and to flush the cached data page in the first cache device to a further storage device other than the cache.

13. The apparatus according to claim 11, wherein the cache includes a cache page hash table that has a third link to a first shadow page cached in the first cache device and a fourth link to a second shadow page cached in the second cache device, and the shadow pages have IO historical information of corresponding cache devices;
  wherein the enable-keeping unit is configured to keep the fourth link; and
  wherein the historical information removing unit is configured to disconnect the third link and remove the first shadow page cached in the first cache device.

14. The apparatus according to claim 11, wherein the cache includes a cache page hash table that has a fifth link to cache page metadata in the first cache device and a sixth link to cache page metadata in the second cache device, and the cache page metadata stores mapping relationships between a cached data page in a corresponding cache device and a cached data page in a further storage device other than the cache;
  wherein the enable-keeping unit may be configured to keep the sixth link; and wherein the data page removing unit may be configured to disconnect the fifth link and remove the cache page metadata in the first cache device.

15. The apparatus according to claim 11, wherein the cache includes a global shadow list that has a seventh link to a first shadow page cached in the first cache device and an eighth link to a second shadow page cached in the second cache device, and the shadow pages have IO historical information of the corresponding cache devices;
   wherein the enable-keeping unit is configured to keep the eighth link; and
   wherein the historical information removing unit is configured to disconnect the seventh link and remove the first shadow page cached in the first cache device.

16. The apparatus according to claim 11, wherein the historical information removing unit configured to remove cached input output (IO) historical information from the first cache device further comprises:
   a memory releasing unit configured to, after the data page removing unit removes the cached data page from the first cache device and the historical information removing unit removes the cached IO historical information from the first cache device, release a memory for the first cache device and return the memory to a memory managing unit.

17. The apparatus according to claim 11, wherein one of the first cache device and the second cache device comprises a pair of solid-state disk (SSD).

18. The apparatus according to claim 12, wherein the further storage device includes a hard disk driver (HDD).

19. The apparatus according to claim 11, further comprising:
   a searching unit configured to search the cache for an IO request during a reduction of a cache device from the cache; and
   the hit processing unit configured to, read the first data page from the first cache device and transmit a response to an upper layer if the first cache device has been labeled as a to-be-reduced device and it is found through the search that the first data page associated with the IO request is cached in the first cache device.

* * * * *